US008382500B2

(12) United States Patent
Adachi

(10) Patent No.: US 8,382,500 B2
(45) Date of Patent: Feb. 26, 2013

(54) ROTATING CONNECTOR DEVICE

(75) Inventor: Ryoichi Adachi, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/582,975

(22) PCT Filed: Oct. 20, 2011

(86) PCT No.: PCT/JP2011/005875

§ 371 (c)(1),
(2), (4) Date: Sep. 5, 2012

(87) PCT Pub. No.: WO2012/053212

PCT Pub. Date: Apr. 26, 2012

(65) Prior Publication Data

US 2012/0329314 A1 Dec. 27, 2012

(30) Foreign Application Priority Data

Oct. 20, 2010 (JP) ................................ 2010-235803

(51) Int. Cl.
*H01R 3/00* (2006.01)

(52) U.S. Cl. ....................................................... 439/164

(58) Field of Classification Search .................... 439/13, 439/15, 17, 164

See application file for complete search history.

(56) References Cited

U.S. PATENT DOCUMENTS 7,758,363 B2 * 7/2010 Tanaka et al. ................. 439/164
7,775,800 B2 * 8/2010 Reischl et al. .................. 439/15
7,811,108 B2 * 10/2010 Oishi et al. .................... 439/164

FOREIGN PATENT DOCUMENTS

JP 09-326285 12/1997
JP 10-189197 7/1998
JP 11-087006 3/1999
JP 2001-126836 5/2001
JP 2006-216263 8/2006
JP 2010-129285 6/2010

OTHER PUBLICATIONS

International Search Report dated Nov. 29, 2011 for PCT application serial No. PCT/JP2011/005875, 4 pages.

* cited by examiner

*Primary Examiner* — Khiem Nguyen
(74) *Attorney, Agent, or Firm* — Turocy & Watson, LLP

(57) ABSTRACT

A rotary connector device includes a stator, a rotator rotatable relative to the stator, a base ring arranged between the stator and the rotator, a flexible flat cable (14), and a rotating roller. The flexible flat cable (14) has a conductor part (14*a*), and is configured to electrically connect the stator side and the rotator side to each other. The rotating roller is rotatably supported on the base ring, and brings an outer circumferential surface thereof into contact with the flexible flat cable (14), thereby guiding it. The rotating roller is molded by using a die. When a plane including a parting line that is formed at the outer circumferential surface of the rotating roller at a time of the molding is defined as an imaginary plane (90), the imaginary plane (90) is perpendicular to an axis of the rotating roller and does not overlap the conductor part (14*a*) of the flexible flat cable (14).

4 Claims, 6 Drawing Sheets

42 59 32 17 22 17a 12a 12 11a 13 14 25 31 11 27 21 26 58 16 41

31 14 90 272 271 27a 14b 14a

ROTATING CONNECTOR DEVICE

CROSS-REFERENCE TO RELATED APPLICATIONS

This application is a U.S. National Stage of PCT Patent Application No. PCT/JP2011/005875, filed Oct. 20, 2011 and entitled "ROTATING CONNECTOR DEVICE"; which claims priority to Japanese Patent Application No. 2010-235803, filed Oct. 20, 2010 and entitled "ROTARY CONNECTOR DEVICE". The entireties of the above-referenced applications are incorporated herein by reference.

TECHNICAL FIELD

The present invention relates to a rotary connector device, and particularly relates to a configuration for preventing damage to a conductor part of a cable that is provided in a rotary connector device.

BACKGROUND ART

Conventionally known is a rotary connector device for electrically connecting a rotatable side and a fixed side, such as a steering side and a vehicle body side of a vehicle, to each other. In general, steering means of a vehicle is provided with a configuration, such as an airbag, that is required to ensure a reliable operation in an emergency situation. Accordingly, from the viewpoint of the reliability of an operation, downsizing, and the like, a rotary connector device configured to connect a steering side and a vehicle body side to each other by a flexible flat cable or the like is adopted.

Patent Document 1 discloses this type of a rotary connector. The rotary connector of the Patent Document 1 is configured such that a flat cable having a certain length is, in a wound state, accommodated in an annular space formed between an outer cylindrical part (outer cylinder) with a cylindrical shape provided in a stator and an inner cylindrical part (inner cylindrical shaft part) with a cylindrical shape provided in a rotator. This flat cable internally has a conductor part, and this conductor part electrically connects a connector provided in the stator and a connector provided in the rotator to each other. In the annular space, the flat cable is wound in one direction and then wound in the opposite direction with a winding direction being reversed in a U-shaped manner. Such a configuration enables the rotator to rotate in a clockwise direction or a counterclockwise direction the number of times corresponding to the length of the flat cable.

The rotary connector disclosed in the Patent Document 1 includes a ring member (support member) and rotating rollers. The ring member has a disc-like shape, and rotatably supports the rotating rollers that are arranged at regular intervals in a circumferential direction. The rotating rollers are, at their outer circumferential surfaces, in contact with the flat cable, and thereby can smoothly guide the flat cable wound in the annular space.

PRIOR-ART DOCUMENTS

Patent Documents

Patent Document 1: Japanese Patent Application Laid-Open No. 2001-126836

SUMMARY OF THE INVENTION

Problems to be Solved by the Invention

Here, in general, a rotating roller is made of a synthetic resin and manufactured by injection molding. Accordingly, due to an influence of a parting surface of a die used for the injection molding, a projection or a step is formed on, for example, an outer circumferential surface of the rotating roller.

This projection or the like may damage a conductor part of a flat cable at a time of guiding the flat cable. If the conductor part is damaged, electrical connection between a steering side and a vehicle body side of a vehicle may be lost. As a result, the rotary connector device needs to be repaired or replaced.

The present invention is made in view of the circumstances described above, and an object of the present invention is to provide a rotary connector device capable of preventing a damage to a conductor part of a flat cable that might be caused by a projection or the like occurring in a rotating roller.

Means for Solving the Problems and Effects Thereof

The problem to be solved by the present invention is as described above, and next, means for solving the problem and effects thereof will be described.

An aspect of the present invention provides a rotary connector device configured as follows.

That is, the rotary connector device includes a first casing, a second casing, a support member, a cable, and a roller. The second casing is mounted rotatably relative to the first casing. The support member is arranged in an accommodation space that is formed between the first casing and the second casing. The cable includes a conductor part and a covering part that covers the conductor part, and configured to electrically connect a first connector arranged in the first casing and a second connector arranged in the second casing to each other by the conductor part. The roller is rotatably supported on the support member, and configured to, when the second casing rotates relative to the first casing, bring an outer circumferential surface thereof into contact with the cable, thereby guiding the cable. The roller is molded by using a die. When a plane including a parting line that is formed at the outer circumferential surface of the roller at a time of the molding is defined as an imaginary plane, the imaginary plane is arranged so as to be perpendicular to an axis of the roller and so as not to overlap the conductor part of the cable.

Thereby, even in a case where a projection or a step occurs in the parting line formed at the outer circumferential surface of the roller, damage to the conductor part due to the projection or the like is prevented at a time of guiding the cable. Accordingly, a rotary connector device with a high durability is achieved.

Preferably, the rotary connector device is configured as follows. That is, the cable has a plurality of the conductor parts arranged side by side in an axial direction of the roller. The imaginary plane passes between the conductor parts.

This can prevent damage to the conductor parts while adopting a layout where the imaginary plane passes through the cable (in detail, only the covering part). Accordingly, the degree of freedom can be improved in terms of the position of the parting line of the roller, the arrangements of the roller and the cable, and the like.

Preferably, the rotary connector device is configured as follows. That is, the cable electrically connects a steering side and a vehicle body side of a vehicle to each other. The plurality of the conductor parts include an airbag conductor part that transmits a signal concerning an operation of an airbag. The imaginary plane passes between the conductor parts other than the airbag conductor part.

Since an airbag is required to ensure a reliable operation, it is desirable that electrical connection in the airbag conductor part has a higher reliability than that of other configurations (for example, a horn). In this respect, in the above-mentioned configuration, a layout that surely prevents damage to the airbag conductor part which would otherwise be caused by the projection or the like is achieved.

Preferably, the rotary connector device is configured as follows. That is, in the support member, a first restricting portion and a second restricting portion are formed. The first restricting portion restricts the cable against movement toward at least one side in an axial direction of the roller. The second restricting portion restricts the roller against movement toward at least one side in the axial direction of the roller.

This enables the positions of the roller and the cable to be restricted by a single member (support member). Accordingly, the roller and the cable can be accurately arranged with prevention of an accumulation of dimensional errors. Therefore, a layout where the imaginary plane does not overlap the conductor part is more surely achieved. Thus, the probability that the conductor part will be damaged can be further lowered.

EMBODIMENT FOR CARRYING OUT THE INVENTION

Figure 1:
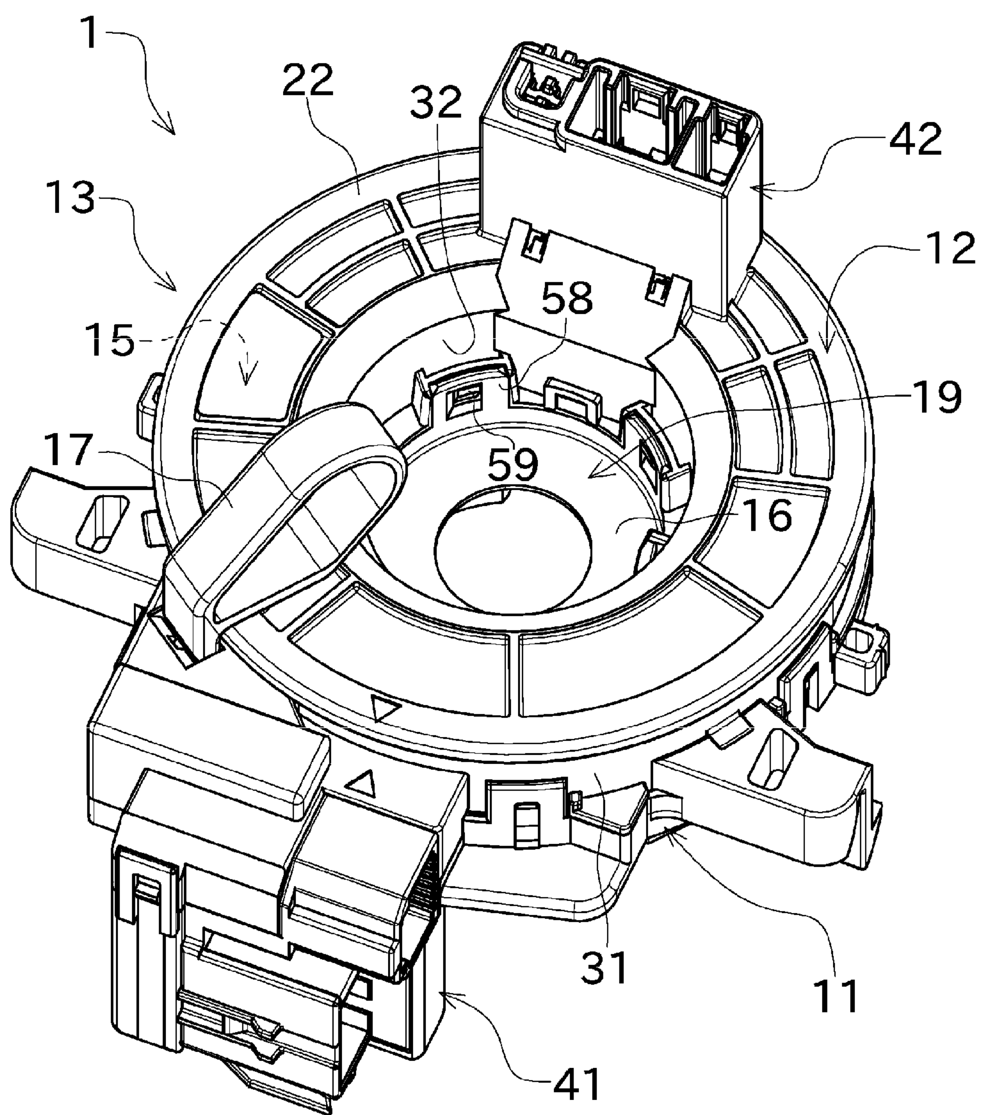
FIG. 1 is an external appearance perspective view showing an overall configuration of a steering roll connector according to one embodiment of the present invention.
Figure 2:
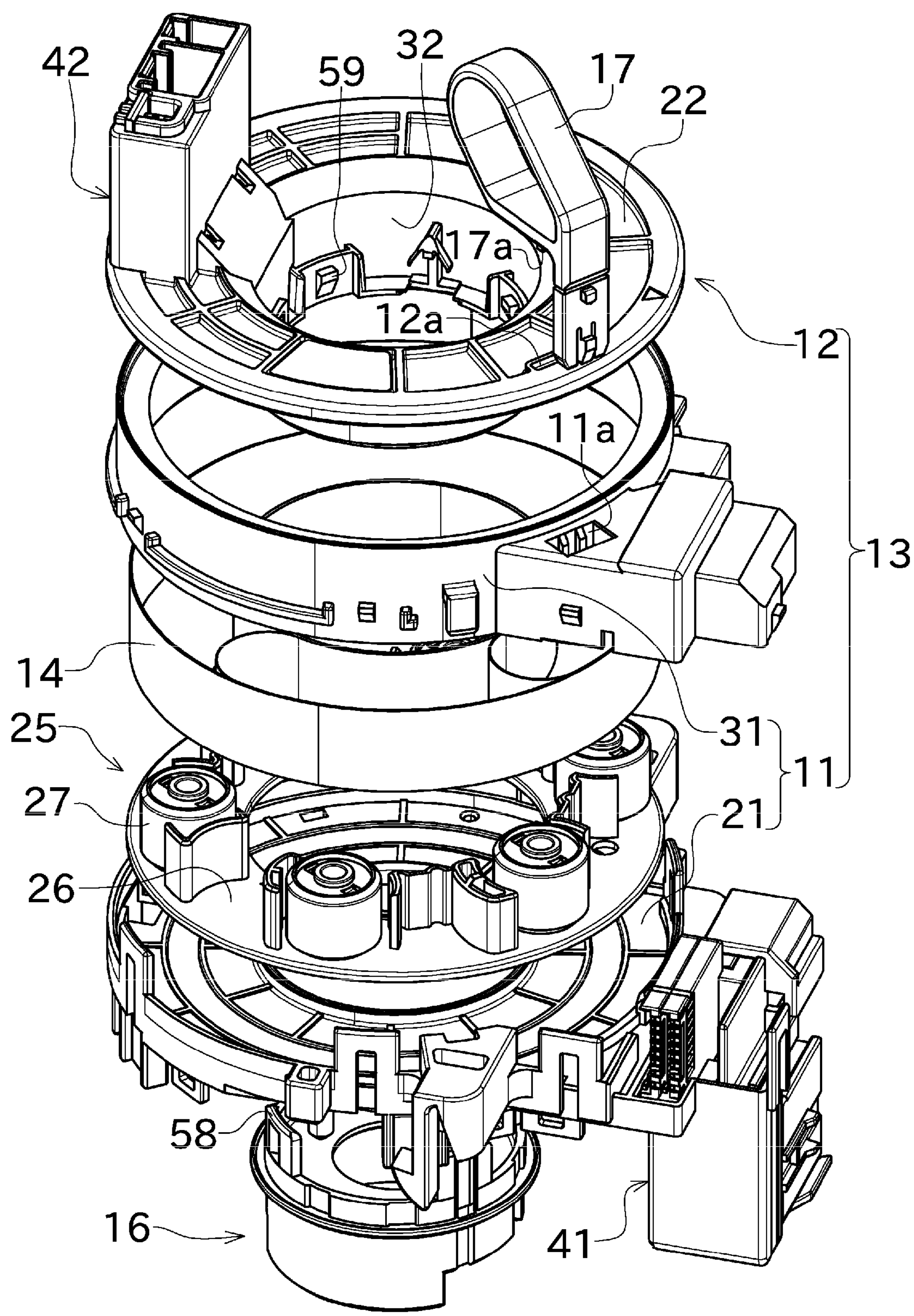
FIG. 2 is an exploded perspective view of the steering roll connector.
Figure 3:
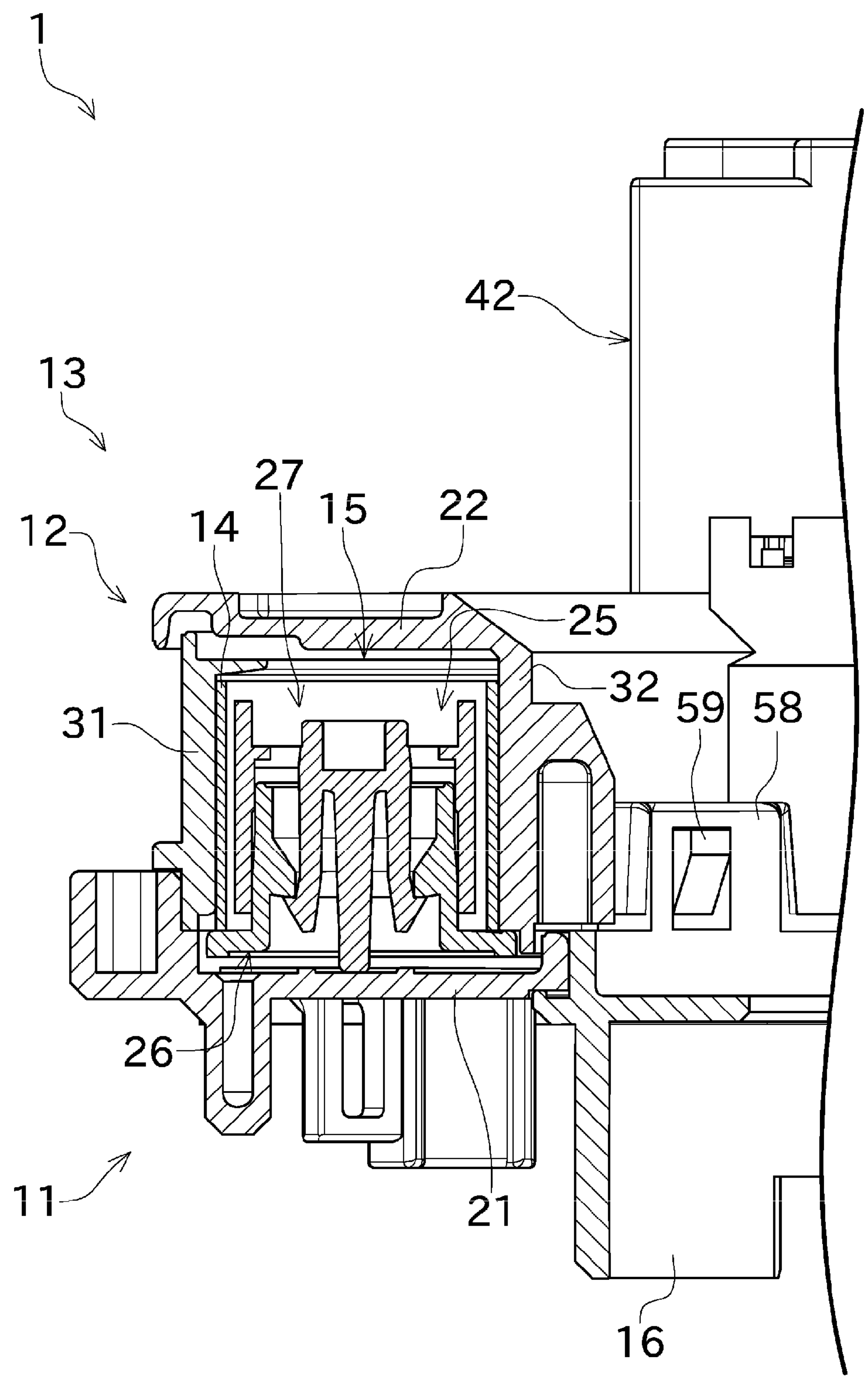
FIG. 3 is a longitudinal cross-sectional view of the steering roll connector.

Next, an embodiment of the invention will be described. FIG. 1 is a perspective view showing an overall configuration of a steering roll connector 1 according to one embodiment of the present invention. FIG. 2 is an exploded perspective view of the steering roll connector 1. FIG. 3 is a longitudinal cross-sectional view of the steering roll connector 1.

The steering roll connector 1 serving as a rotary connector device shown in FIGS. 1 and 2 includes a cable housing 13 having a stator (first casing) 11 and a rotator (second casing) 12 that are rotatable relative to each other.

The stator 11 is fixed to an appropriate member at the vehicle body side, for example, to a combination bracket switch (not shown) of a steering column. As shown in FIG. 1, an insertion hole 19 in the shape of a through hole is formed at the center of the cable housing 13. A steering shaft supported on the steering column is inserted into the insertion hole 19. The stator 11 is mounted rotatably relative to the steering shaft, while the rotator 12 is configured to rotate integrally with the steering shaft. A steering wheel (rotation operation tool) is fixed to the steering shaft.

As shown in FIG. 2 and the like, the stator 11 includes a fixed-side ring plate 21, and an outer cylindrical part 31 having a circular cylindrical shape and fixed to an outer edge portion of the fixed-side ring plate 21. The rotator 12 includes a rotatable-side ring plate 22 having a ring-like shape, and an inner cylindrical part 32 having a circular cylindrical shape and extending perpendicularly from an inner edge of the rotatable-side ring plate 22. The rotator 12 is rotatable relative to the stator 11 around an axis line that is coincident with a rotation axis of the steering shaft.

As shown in FIG. 2, an insertion slot **11*a* and an engagement recess 12*a* are formed in the stator 11 and the rotator 12, respectively. A fixing pin 17 for stopping rotation can be inserted through the insertion slot 11*a*. An engagement projection 17*a* is formed in the fixing pin 17. The fixing pin 17 is inserted through the insertion slot 11*a* and the engagement projection 17*a* is brought into engagement with the engagement recess 12*a*, and thereby the rotator 12 can be locked against rotation relative to the stator 11**.

The fixing pin 17 is temporarily attached at a time of manufacturing the steering roll connector 1, in order to prevent the position of the rotator 12 from being displaced from an intermediate position (a position intermediate between a position of the rotator 12 having been rotated in a clockwise direction to the maximum and a position of the rotator 12 having been rotated in a counterclockwise direction to the maximum) when the steering roll connector 1 is mounted to a vehicle body. This improves an efficiency of an operation for assembling the steering roll connector 1 to the vehicle body, and also prevents an error in the assembling. After the steering roll connector 1 is appropriately mounted to the vehicle body, the fixing pin 17 is broken off at the root of a portion inserted through the insertion slot **11*a*. Thereby, the rotator 12 is made rotatable relative to the stator 11**.

A first connector 41 is mounted to the stator 11, and a second connector 42 is mounted to the rotator 12. The second connector 42 is rotated integrally with the rotation of the rotator 12. Each of the first connector 41 and the second connector 42 is configured for connection with a cable, not shown, extending from an external electrical circuit (for example, a horn switch, an airbag module, or a power source).

The first connector 41 is arranged on the fixed-side ring plate 21, and the second connector 42 is arranged on the rotatable-side ring plate 22. The first connector 41 and the second connector 42 are electrically connected to each other by a flexible flat cable (cable) 14 that is arranged inside the cable housing 13 (inside an accommodation space 15 which will be described later).

The fixed-side ring plate 21 and the rotatable-side ring plate 22 are arranged such that they are opposed to each other in a direction of a rotation axis of the rotator 12 and such that they connect the outer cylindrical part 31 and the inner cylindrical part 32 to each other. The inner cylindrical part 32 is arranged at the inner side of the outer cylindrical part 31. The outer cylindrical part 31 and the inner cylindrical part 32 are arranged opposed to each other in a radial direction. In the above-described configuration, an accommodation space 15 that is an annular space surrounded by the fixed-side ring plate 21, the rotatable-side ring plate 22, the outer cylindrical part 31, and the inner cylindrical part 32, is formed.

A sleeve 16 is fixed to the rotator 12. The sleeve 16 has a projection 58. In the rotator 12, a claw 59 is formed at a position corresponding to the projection 58. The projection 58 is hooked on the claw 59, and thereby the sleeve 16 is attached unrotatably relative to the rotator 12.

As shown in FIGS. 2 and 3, a retainer 25 and the flexible flat cable 14 are accommodated within the accommodation space 15. The retainer 25 includes a base ring (support member) 26 and a plurality of rotating rollers (rollers) 27.

Figure 6:
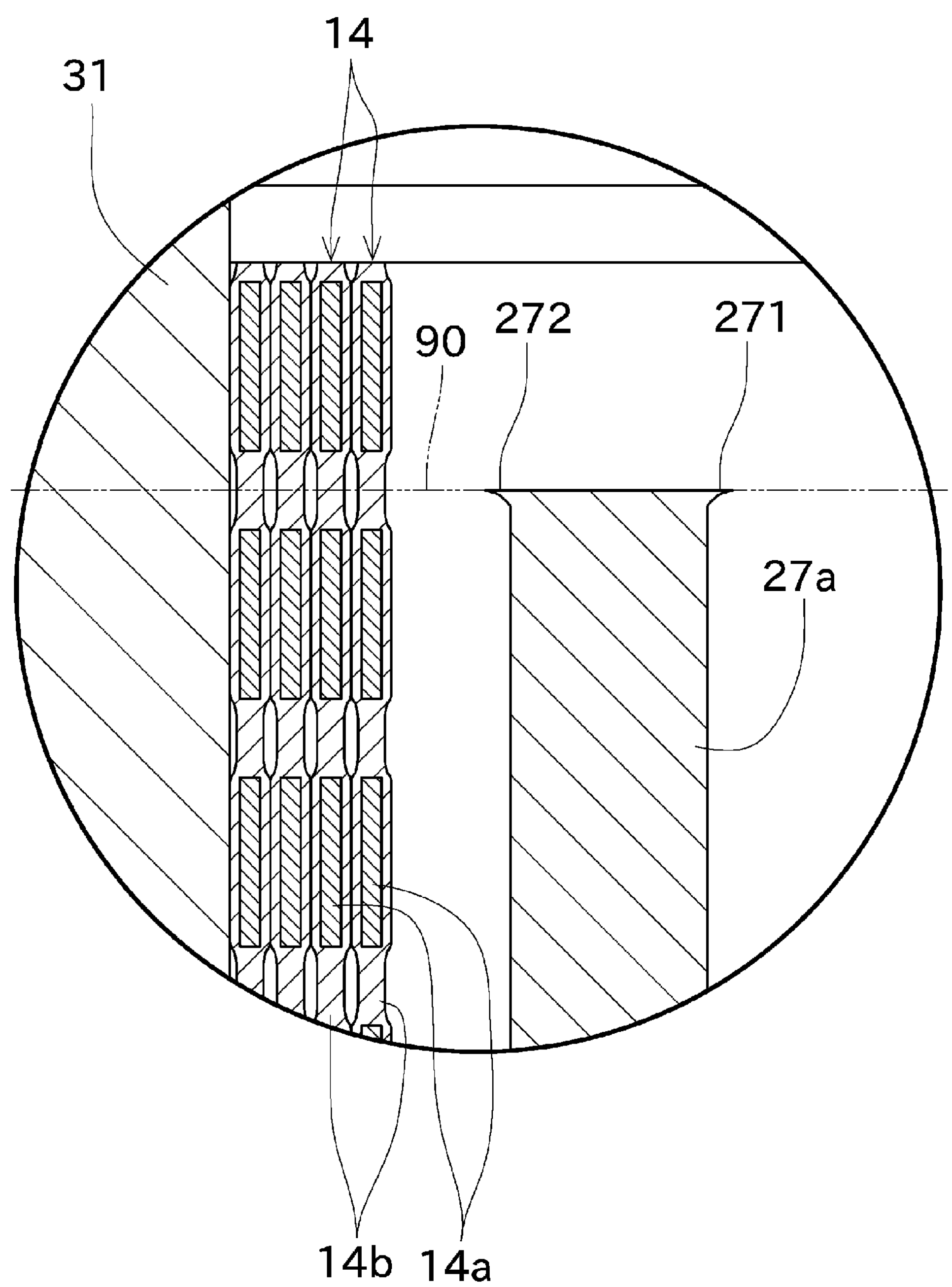
FIG. 6 is an enlarged longitudinal cross-sectional view showing a positional relationship between projections occurring in the rotating roller and conductor parts of a flexible flat cable.

As shown in FIG. 6 which will be described later, the flexible flat cable 14 includes a plurality of conductor parts 14*a* arranged side by side and a covering part 14*b* arranged so as to cover the conductor parts 14*a*. The flexible flat cable 14 is accommodated in the accommodation space 15 while being wound as appropriate.

As shown in FIG. 2, the base ring 26 is configured as a plate-like member having an annular shape, and arranged adjacent to the fixed-side ring plate 21. The base ring 26 is rotatable around the rotation axis of the rotator 12. As shown in FIG. 2, the rotating rollers 27 are arranged on one surface side of the base ring 26 at regular intervals in a circumferential direction. Each of the rotating rollers 27 is rotatable around an axis that is parallel to the rotation axis of the rotator 12.

Figure 4:
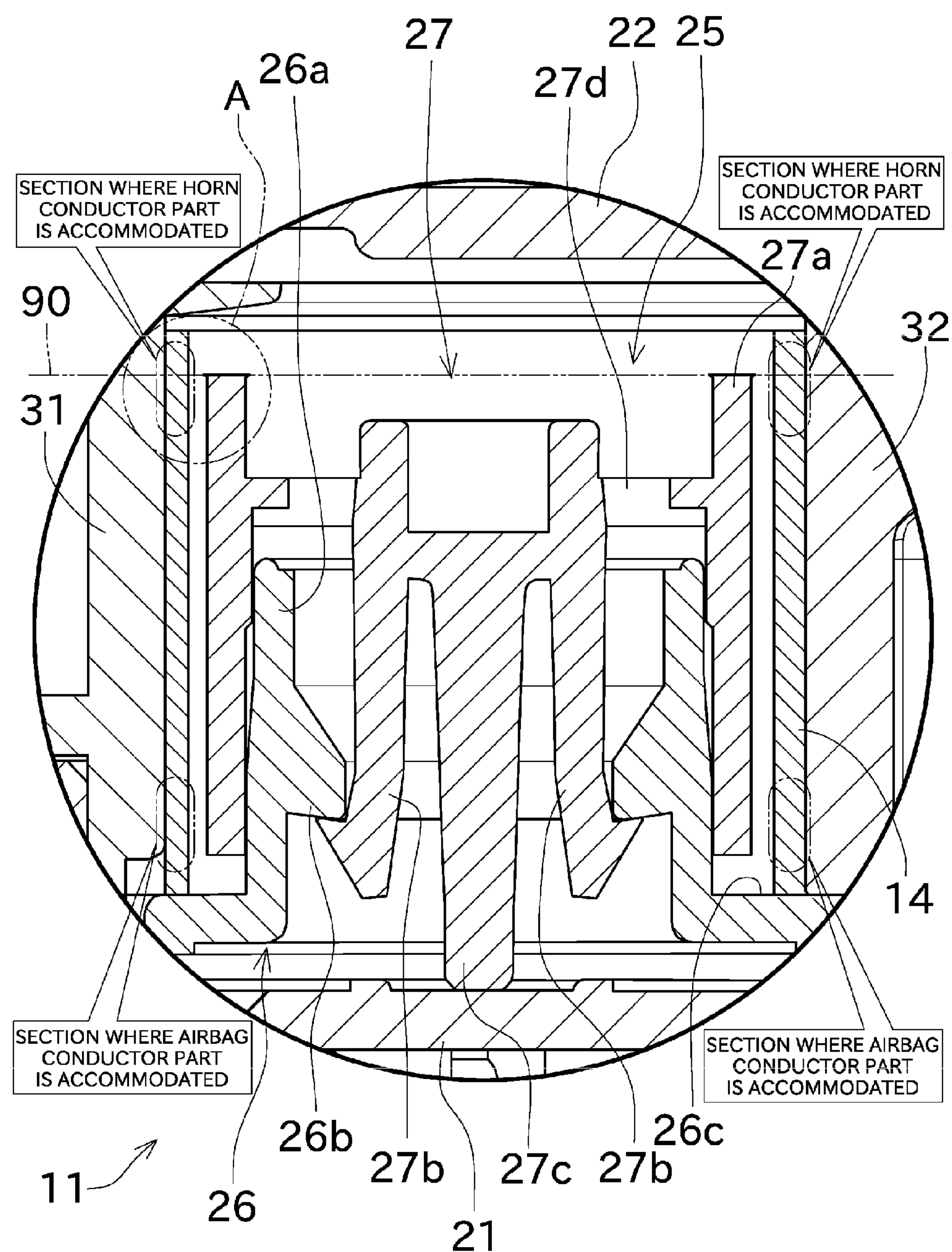
FIG. 4 is an enlarged longitudinal cross-sectional view showing a configuration of a part in the vicinity of a rotating roller.

In the following, detailed configurations of the base ring 26 and the rotating roller 27 will be described with reference to FIG. 4. FIG. 4 is an enlarged longitudinal cross-sectional view showing a configuration of a part in the vicinity of the rotating roller 27.

As shown in FIG. 4 and the like, the rotating roller 27 has an outer cylindrical part 27*a*, two elastic engagement pieces 27*b* and 27*b*, and a contact shaft 27*c*. The outer cylindrical part 27*a* is a circular cylindrical member that forms an outer circumferential surface of the rotating roller 27. The outer cylindrical part 27*a* has a hollow shape provided with a lid portion 27*d* that closes one end side (in FIG. 4, the upper end side) thereof. The elastic engagement pieces 27*b* and 27*b* are formed so as to protrude in a direction (in FIG. 4, the downward direction) away from the rotatable-side ring plate 22.

Each of the two elastic engagement pieces 27*b* and 27*b* is configured such that a surface thereof forms a part of a tapered surface. This tapered surface is gradually flared out toward a direction away from the rotatable-side ring plate 22. The contact shaft 27*c* is a rod-like member formed so as to be coincident with a rotation axis line of the rotating roller 27. The contact shaft 27*c* extends toward the direction away from the rotatable-side ring plate 22, and the lower end thereof protrudes out of the outer cylindrical part 27*a*.

As shown in FIG. 4 and the like, on the base ring 26, a mounting cylinder 26*a* having a circular cylindrical shape is formed at a position corresponding to a position where each rotating roller 27 is mounted. This mounting cylinder 26*a* has a hollow shape, to form a through hole extending through the base ring 26 from one surface side to the other surface side thereof. A protrusion (second restricting portion) 26*b* protruding toward the inside of the mounting cylinder 26*a* is formed at the inner circumference side of the mounting cylinder 26*a*. Moreover, the base ring 26 has an abutting surface (first restricting portion) 26*c* that is a plane extending toward the inside of the base ring 26 from an end portion of the mounting cylinder 26*a* located at the fixed-side ring plate 21 side (at the lower side in FIG. 4).

In this configuration, for arranging the rotating roller 27 on the base ring 26, the rotating roller 27 is mounted such that the outer cylindrical part 27*a* is put over the mounting cylinder 26*a*. At this time, as shown in FIG. 4 and the like, the contact shaft 27*c* and the elastic engagement pieces 27*b* are inserted into the inside of the mounting cylinder 26*a*.

Here, in a state where the rotating roller 27 is mounted to the base ring 26, the elastic engagement pieces 27*b* cause slight elastic deformation toward the rotating roller 27 side because of the protrusion 26*b*, and a resilient force thereof brings the tapered surfaces of the elastic engagement pieces 27*b* into contact with the protrusion 26*b*. Due to an action of this resilient force, a force in the direction away from the rotatable-side ring plate 22 acts on the rotating roller 27. However, an end portion of the contact shaft 27*c* is brought into contact with the fixed-side ring plate 21, and thereby a movement of the rotating roller 27 in the direction away from the rotatable-side ring plate 22 is restricted. As a result, positioning of the rotating roller 27 relative to the fixed-side ring plate 21 is set.

On the other hand, as a reaction against the force acting on the rotating roller 27 as described above, the base ring 26 is biased toward the rotatable-side ring plate 22. However, a lower end portion of the inner cylindrical part 32 is in contact with the abutting surface 26*c* of the base ring 26, and therefore the base ring 26 on which an upward biasing force is acting can be received by the inner cylindrical part 32. As a result, positioning of the base ring 26 relative to the inner cylindrical part 32 is set.

After the rotating rollers 27 are mounted to the base ring 26, the flexible flat cable 14 is placed on the abutting surface 26*c* of the base ring 26. Accordingly, the base ring 26 restricts a movement of the flexible flat cable 14 in the direction away from the rotatable-side ring plate 22. Moreover, hook-like portions formed at the distal ends of the elastic engagement pieces 27*b* of the rotating roller 27 are brought into contact with the protrusion 26*b* of the base ring 26, and thereby a movement of the rotating roller 27 toward the rotatable-side ring plate 22 is restricted. That is, the base ring 26 restricts the movements of both the rotating roller 27 and the flexible flat cable 14 in the axial direction of the rotating roller 27.

In this configuration, the positional relationship between the rotating roller 27 and the flexible flat cable 14 is unlikely to displace in the axial direction. Particularly, in this embodiment, since such a displacement is prevented by a single member (base ring 26), an accumulation of errors can be prevented and a displacement of the position can be further reduced.

Figure 5:
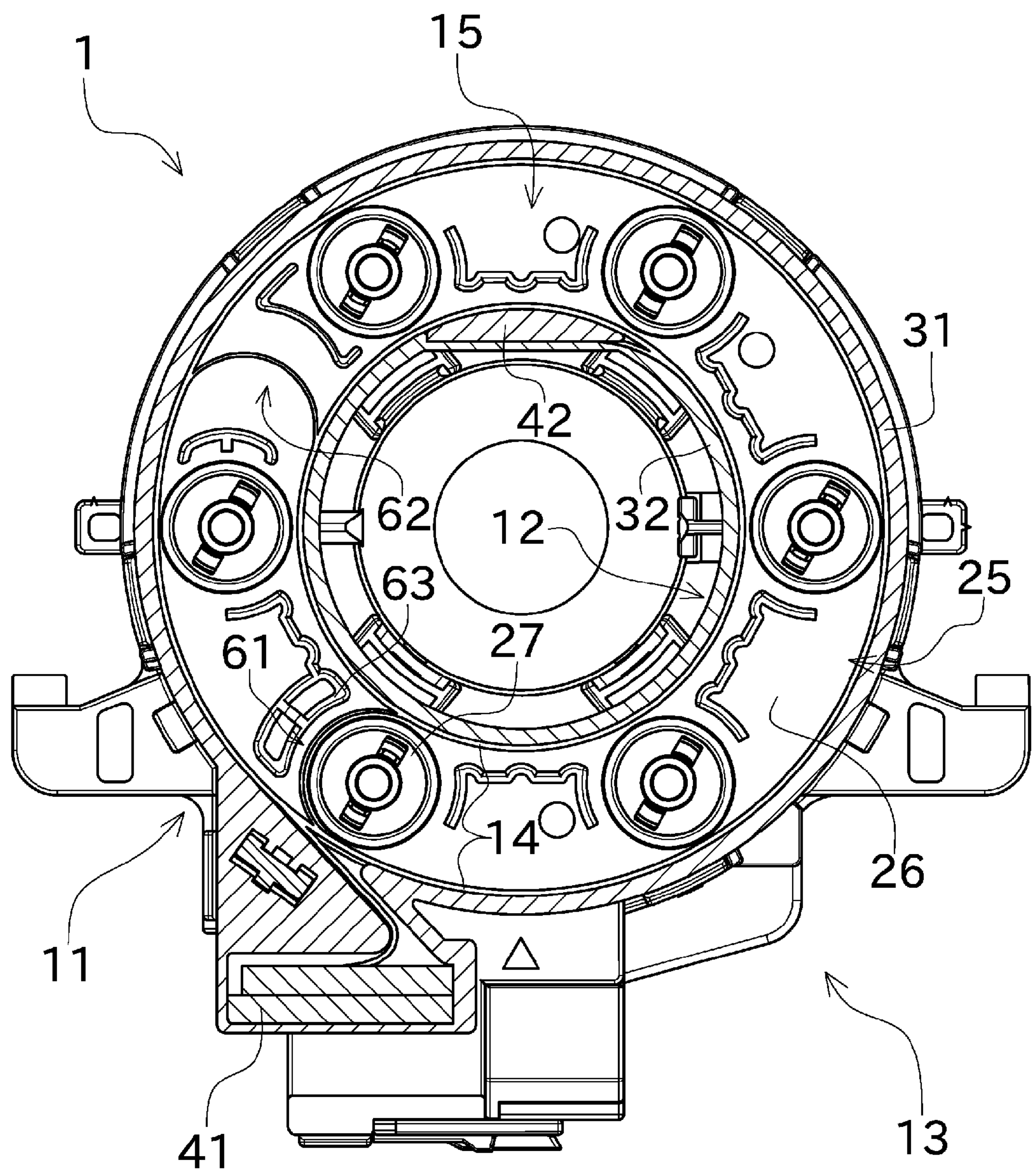
FIG. 5 is a cross-sectional plan view of the steering roll connector.

Next, a configuration in which the flexible flat cable 14 is accommodated in the accommodation space 15 will be described with reference to FIG. 5. FIG. 5 is a cross-sectional plan view of the steering roll connector 1.

As shown in FIG. 5, each of the two flexible flat cables 14 is drawn out from the first connector 41 into the accommodation space 15 and, while being overlapped with each other, wound in the clockwise direction along an inner circumferential surface of the outer cylindrical part 31.

Then, in a first reversing section 61, one of the two flexible flat cables 14 is folded back into a U-like shape, and thus a direction thereof is reversed. The first reversing section 61 includes one rotating roller 27 and a guide wall 63. The rotating roller 27 of the first reversing section 61 is in contact with the inside of a curved portion of the U-like shape of the flexible flat cable 14, thus guiding the flexible flat cable 14. The guide wall 63 is in contact with the outside of the curved portion of the U-like shape of the flexible flat cable 14, thus guiding the flexible flat cable 14. In the above-described configuration, the flexible flat cable 14 extends between the rotating roller 27 and the guide wall 63 so as to wrap around the rotating roller 27, thus reversing the direction thereof.

Meanwhile, in a second reversing section 62, the other flexible flat cable 14 is folded back into a U-like shape, and thus a direction thereof is reversed. In the second reversing section 62, unlike the first reversing section 61, the rotating roller 27 and the guide wall 63 are not arranged. Instead, a sufficient space is ensured for reversing the direction of the flexible flat cable 14 while making the U-like shape.

After the directions are reversed in the reversing sections 61 and 62, the flexible flat cables 14 are wound in the counterclockwise direction so as to extend along an outer circumferential surface of the inner cylindrical part 32. Finally, the flexible flat cables 14 are drawn out from the accommodation space 15 and connected to the second connector 42 side.

In this manner, within the accommodation space 15, the flexible flat cables 14 are wound with an appropriate length of loosening. This length of loosening changes as the rotator 12 rotates relative to the stator 11. In the steering roll connector 1 of this embodiment, the retainer 25 appropriately rotates so as to follow the change in the loosening length, and thereby enables the flexible flat cables 14 to be always held in an aligned state within the accommodation space 15.

A specific description is as follows. For example, when the rotator 12 rotates in the clockwise direction in FIG. 5, a part of the flexible flat cables 14 wound on the inner cylindrical part 32 is rotated together in the clockwise direction. This causes the flexible flat cables 14 to be wound back from the outer circumferential surface of the inner cylindrical part 32. The flexible flat cables 14 have winding directions thereof reversed in the reversing sections 61 and 62, and are rewound onto the inner circumferential surface of the outer cylindrical part 31. At this time, in the first reversing section 61, a part of the flexible flat cable 14 reversed in the U-like shape applies a force to the guide wall 63, to cause the retainer 25 as a whole to rotate in the clockwise direction. Here, the plurality of rotating rollers 27 provided in the retainer 25 guide the flexible flat cables 14 so as to allow the flexible flat cables 14 to appropriately rotate along the inner circumferential surface of the outer cylindrical part 31. In the above-described manner, the rotator 12 can be rotated in the clockwise direction, until the flexible flat cables 14 are wholly wound back from the outer circumferential surface of the inner cylindrical part 32.

On the other hand, when the rotator 12 rotates in the counterclockwise direction in FIG. 5, a part of the flexible flat cables 14 wound on the inner cylindrical part 32 is rotated together in the counterclockwise direction. This causes the flexible flat cables 14 to be wound back from the inner circumferential surface of the outer cylindrical part 31. The flexible flat cables 14 have the winding directions thereof reversed in the reversing sections 61 and 62, and are wound onto the outer circumferential surface of the inner cylindrical part 32. At this time, in the first reversing section 61, a part of the flexible flat cable 14 reversed in the U-like shape applies a force to the rotating roller 27, to cause the retainer 25 as a whole to rotate in the counterclockwise direction. Here, similarly to the above, the rotating rollers 27 provided in the retainer 25 appropriately guide the flexible flat cables 14 so as to allow the flexible flat cables 14 to appropriately rotate along the inner circumferential surface of the outer cylindrical part 31. In the above-described manner, the rotator 12 can be rotated in the counterclockwise direction, until the flexible flat cables 14 are wholly wound back from the inner circumferential surface of the outer cylindrical part 31.

As described above, when the rotator 12 rotates relative to the stator 11, the flexible flat cables 14 are brought into contact with the outer circumferential surfaces of the rotating rollers 27. Here, in general, a rotating roller is made of a synthetic resin and manufactured by injection molding. Therefore, in the rotating roller, a projection or a step is often formed in a parting line. This projection or the like may damage a conductor part of a flexible flat cable. Preventing such damage to the conductor part has been a problem of the conventional configuration. Particularly, such damage to the conductor part may hinder an accurate operation of an airbag. Thus, an early solution thereto has been demanded.

In the following, a configuration for solving this problem will be described with reference to FIGS. 4 and 6. FIG. 6 is an enlarged view of a region A of FIG. 4, showing the positional relationship between projections 271 and 272 occurring in the rotating roller 27 and the conductor parts 14*a* of the flexible flat cable 14.

In the rotating roller 27 of this embodiment, a parting surface of a die of an injection molding apparatus is set at an edge surface portion of the outer cylindrical part 27*a* located at the rotatable-side ring plate 22 side (at the upper side in FIG. 4). Accordingly, in the rotating roller 27, a circular parting line is formed in each of an inner circumferential end and an outer circumferential end of the edge surface of the outer cylindrical part 27*a*. As shown in FIG. 6, a projection 271 and a projection 272 are formed at positions corresponding to the parting lines.

Here, the flexible flat cables 14 are arranged on the abutting surface 26*c* of the base ring 26 as described above. In this embodiment, two flexible flat cables 14 are used, and the conductor parts 14*a* provided in these two flexible flat cables 14 have the same shape and the same intervals. Therefore, as shown in FIG. 6, the conductor parts 14*a* in the two flexible flat cables 14 have the same height in the axial direction of the rotating roller 27. FIG. 6 shows four flexible flat cables 14, because each of the two flexible flat cables 14 is wound two turns.

The rotating roller 27 of this embodiment has such a layout that, when a plane including the circular parting line formed at the outer circumference thereof is defined as an imaginary plane 90 (FIGS. 4 and 6), the imaginary plane 90 does not pass through the conductor parts 14*a* (FIG. 6). In this configuration, when the flexible flat cables 14 are brought into contact with the outer circumferential surface of the rotating roller 27, the projection 272 touches a position avoiding the conductor parts 14*a*. Therefore, damage to the conductor parts 14*a* can be prevented. In this embodiment, the parting line at the outer circumferential surface of the rotating roller 27 is formed with a circular shape. Accordingly, the imaginary plane 90 including this parting line defines a plane that is perpendicular to the rotation axis of the rotating roller 27.

For achieving a layout where the imaginary plane 90 does not pass through the conductor parts 14*a*, for example, the following matters are to be considered: the sizes of the rotating roller 27, the base ring 26, and members to be assembled thereto, the position of the parting line of the rotating roller 27, and an arrangement of the conductor parts 14*a* of the flexible flat cables 14 to be adopted.

The flexible flat cables 14 transmit various signals such as a signal for operating a horn and a signal for operating the airbag. In this embodiment, as shown in FIG. 4, the flexible flat cable 14 is configured such that the conductor part 14*a* (airbag conductor part) that transmits the signal for operating the airbag is accommodated near an end portion of the flexible flat cable 14 located at the fixed-side ring plate 21 side. This enables the projection 272 and the airbag conductor part to be located away from each other at a large distance. Thus, damage to the airbag conductor part can be surely prevented.

In this embodiment, the flexible flat cable 14 is configured such that the conductor part 14*a* (horn conductor part) that transmits the signal for operating the horn is accommodated near an end portion of the flexible flat cable 14 located at the rotatable-side ring plate 22 side. Therefore, the above-described configuration can also be expressed as "causing the imaginary plane 90 to pass between the conductor parts 14*a* other than the airbag conductor part".

To effectively prevent the projection 272 from damaging the airbag conductor part, it suffices that the airbag conductor part is distanced from the imaginary plane 90 to a certain extent. For example, even when the airbag conductor part is accommodated near the widthwise center of the flexible flat cable 14, the prevention of damage to the airbag conductor part can be sufficiently achieved.

The conductor part 14*a* to be accommodated in a part of the flexible flat cable 14 located at the rotatable-side ring plate 22 side (at the side close to the imaginary plane 90) may be a conductor part other than the horn conductor part. However, the conductor part 14*a* accommodated in this position has a relatively high probability of being damaged by the projection 272. Therefore, it is desirable that the conductor part 14*a* that will give merely a small adverse influence when being damaged is arranged in this position.

In the above-described manner, the steering roll connector 1 configured to effectively prevent damage to the conductor parts 14*a* (particularly, the airbag conductor part) of the flexible flat cable 14 is achieved.

As shown above, the steering roll connector 1 of this embodiment includes the stator 11, the rotator 12, the base ring 26, the flexible flat cables 14, and the rotating rollers 27. The rotator 12 is mounted rotatably relative to the stator 11. The base ring 26 is arranged in the accommodation space 15 that is formed between the stator 11 and the rotator 12. The flexible flat cable 14 includes the conductor parts 14*a* and the covering part 14*b* that covers the conductor parts 14*a*, and electrically connects the first connector 41 arranged in the stator 11 and the second connector 42 arranged in the rotator 12 to each other by the conductor parts 14*a*. The rotating rollers 27 are rotatably supported on the base ring 26 and, when the rotator 12 rotates relative to the stator 11, bring the outer circumferential surfaces thereof into contact with the flexible flat cables 14, thereby guiding the flexible flat cables 14. The rotating roller 27 is molded by using a die. When the plane including the parting line that is formed at the outer circumferential surface of the rotating roller 27 during the molding is defined as the imaginary plane 90, the imaginary plane 90 is arranged so as to be perpendicular to the axis of the rotating roller 27 and so as not to overlap the conductor parts 14*a* of the flexible flat cables 14.

This can prevent damage to the conductor parts 14*a* which would otherwise be caused by the projection 272 formed at the outer circumferential surface of the rotating roller 27. Accordingly, the steering roll connector 1 with a high durability is achieved.

In the steering roll connector 1 of this embodiment, the flexible flat cable 14 has the plurality of conductor parts 14*a* arranged side by side in the axial direction of the rotating roller 27. The imaginary plane 90 passes between the conductor parts 14*a*.

This can prevent damage to the conductor parts 14*a* while adopting a layout where the imaginary plane 90 passes through the flexible flat cable 14 (in detail, only the covering part 14*b*). Accordingly, the degree of freedom can be improved in terms of the position of the parting line of the rotating roller 27, the arrangements of the rotating rollers 27 and the flexible flat cables 14, and the like.

In the steering roll connector 1 of this embodiment, the flexible flat cables 14 electrically connect a steering side and a vehicle body side of a vehicle to each other. The plurality of conductor parts 14*a* include an airbag conductor part that transmits a signal concerning an operation of an airbag. The imaginary plane 90 passes between the conductor parts 14*a* other than the airbag conductor part.

Accordingly, a layout that surely prevents damage to the airbag conductor part which would otherwise be caused by the projection 272 is achieved.

In the steering roll connector 1 of this embodiment, the abutting surface 26*c* and the protrusion 26*b* are formed on the base ring 26. The abutting surface 26*c* restricts the movement of the flexible flat cables 14 toward one side (that is, the side away from the rotatable-side ring plate 22) in the axial direction of the rotating roller 27. The protrusion 26*b* restricts the movement of the rotating roller 27 toward one side (that is, the side away from the fixed-side ring plate 21) in the axial direction of the rotating roller 27.

This enables the positions of the rotating rollers 27 and the flexible flat cables 14 to be restricted by a single member (base ring 26). Accordingly, the rotating rollers 27 and the flexible flat cables 14 can be accurately arranged with prevention of an accumulation of dimensional errors. Therefore, a layout where the imaginary plane does not overlap the conductor parts 14*a* is more surely achieved. Thus, the probability that the conductor parts 14*a* will be damaged can be further lowered.

While a preferred embodiment of the present invention has been described above, the above-described configuration may be modified, for example, as follows.

The position of the parting line formed in the rotating roller 27 may not necessarily be set on the edge surface of the outer cylindrical part 27*a* located at the side close to the rotatable-side ring plate 22. Any appropriate position may be adoptable as long as the layout where the imaginary plane 90 does not pass through the conductor parts 14*a* is achieved. For example, in a possible configuration, the parting line may be formed in an end portion (a base end portion of the rotating roller 27, at the lower end in FIG. 4) of the outer cylindrical part 27*a* located at the side opposite to the side adopted in this embodiment. Moreover, the position where the parting line is formed may be different between the outer circumference side and the inner circumference side of the outer cylindrical part 27*a*.

In the above-described embodiment, the imaginary plane 90 passes between the conductor parts 14*a*, but alternatively the imaginary plane 90 may pass a position at the further rotatable-side ring plate 22 side of the conductor part 14*a* that is positioned in the end portion at the rotatable-side ring plate 22 side (at the upper side in FIG. 4).

The winding direction in which the flexible flat cable 14 is wound within the cable housing 13 may be the direction reverse to that of the above-described embodiment. The number of the flexible flat cables 14 accommodated may be one, or three or more, as appropriate.

DESCRIPTION OF THE REFERENCE NUMERALS

1 steering roll connector (rotary connector device)
11 stator (first casing)
12 rotator (second casing)
14 flexible flat cable (cable)
15 accommodation space
25 retainer
26 base ring (support member)
27 rotating roller (roller)
90 imaginary plane

The invention claimed is:

1. A rotary connector device comprising:

a first casing;

a second casing mounted rotatably relative to the first casing;

a support member arranged in an accommodation space that is formed between the first casing and the second casing;

a cable including a conductor part and a covering part that covers the conductor part, and configured to electrically connect a first connector arranged in the first casing and a second connector arranged in the second casing to each other by the conductor part; and a roller rotatably supported on the support member, and configured to, when the second casing rotates relative to the first casing, bring an outer circumferential surface thereof into contact with the cable, thereby guiding the cable, wherein the roller is molded by using a die, when a plane including a parting line that is formed at the outer circumferential surface of the roller at a time of the molding is defined as an imaginary plane, the imaginary plane is arranged so as to be perpendicular to an axis of the roller and so as not to overlap the conductor part of the cable.

2. The rotary connector device according to claim 1, wherein the cable has a plurality of the conductor parts arranged side by side in an axial direction of the roller, the imaginary plane passes between the conductor parts.

3. The rotary connector device according to claim 2, wherein the cable electrically connects a steering side and a vehicle body side of a vehicle to each other, the plurality of the conductor parts include an airbag conductor part that transmits a signal concerning an operation of an airbag, the imaginary plane passes between the conductor parts other than the airbag conductor part.

4. The rotary connector device according to claim 1, wherein in the support member, a first restricting portion and a second restricting portion are formed, the first restricting portion restricts the cable against movement toward at least one side in an axial direction of the roller, the second restricting portion restricts the roller against movement toward at least one side in the axial direction of the roller.

* * * * *